UNITED STATES PATENT OFFICE.

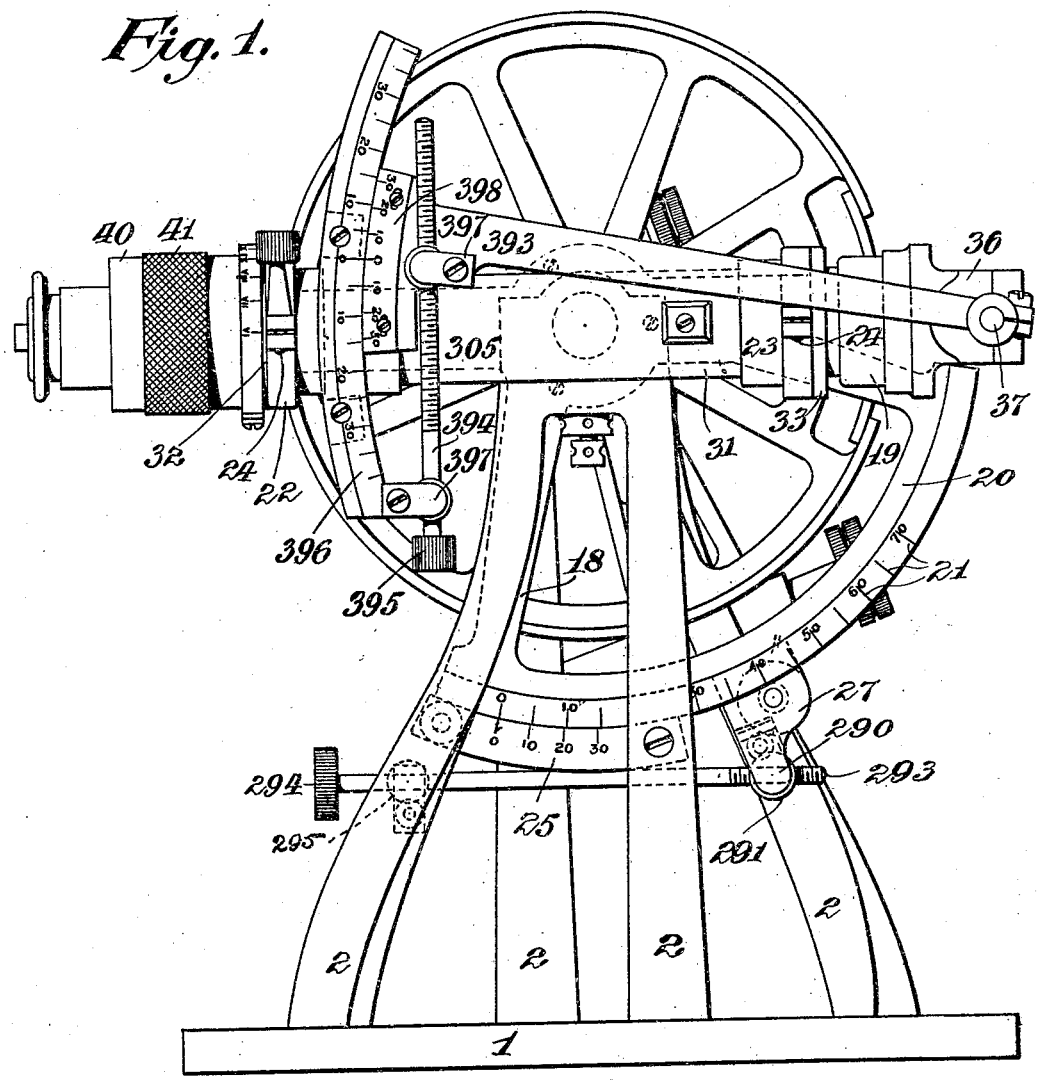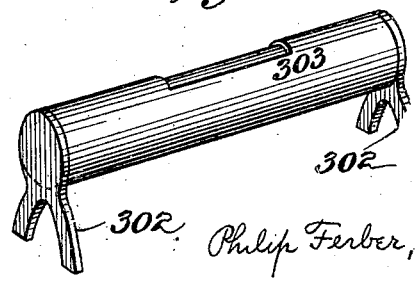

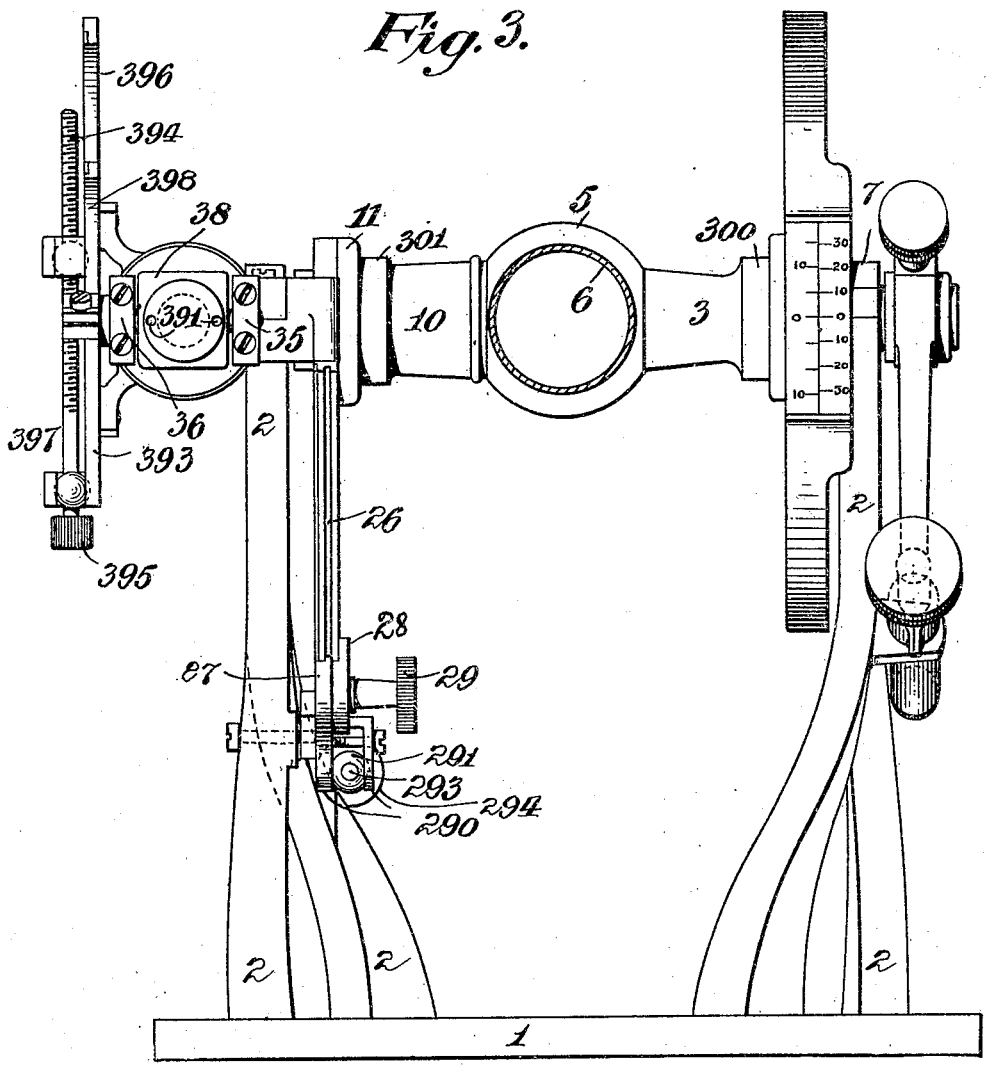

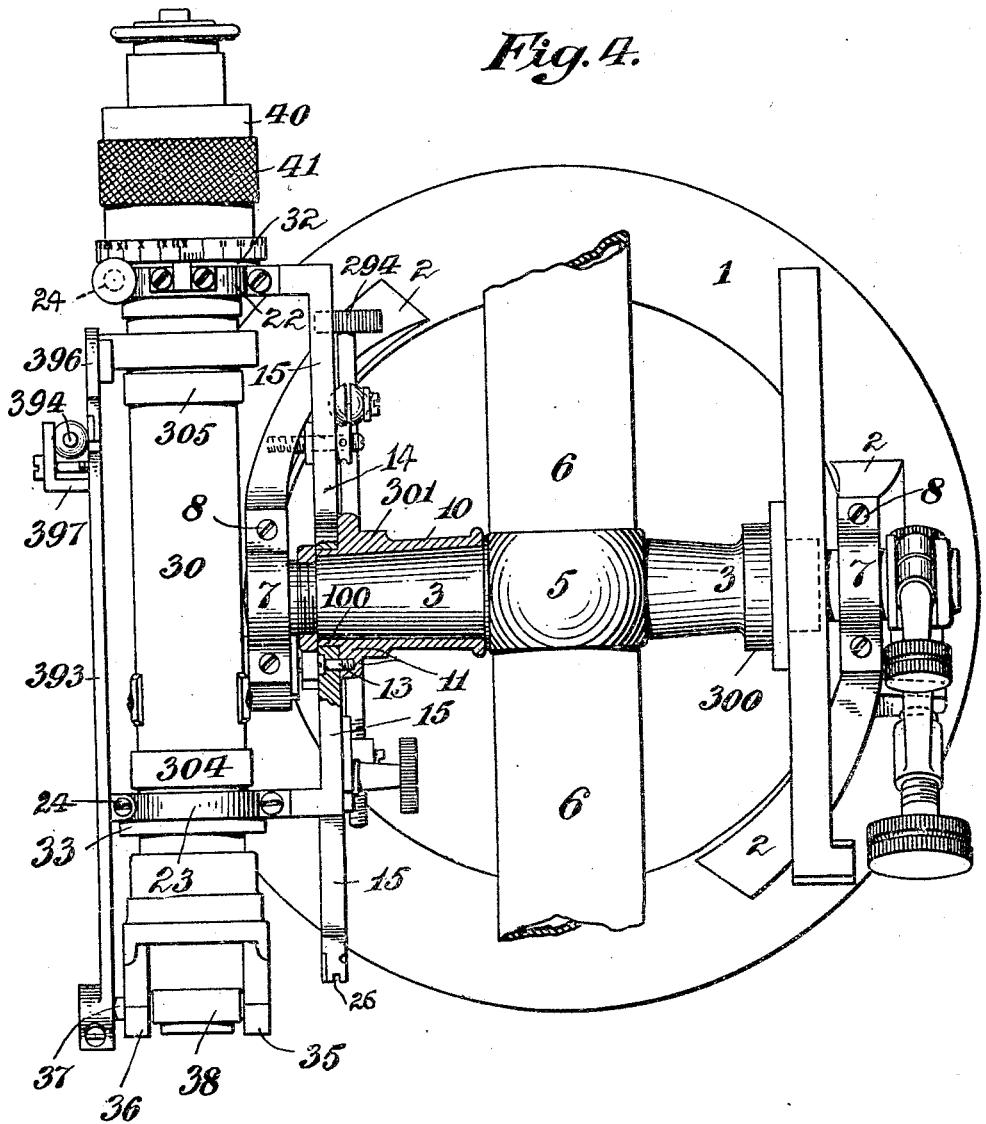

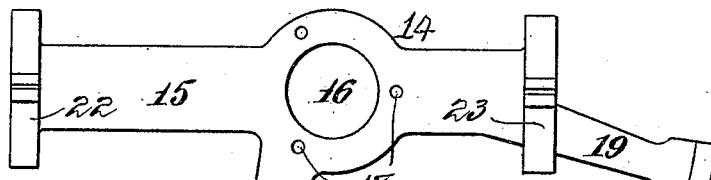
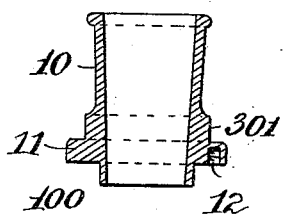
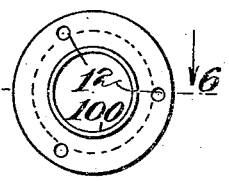
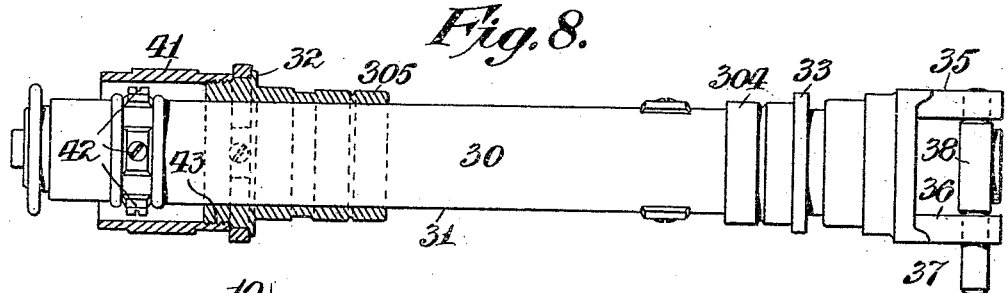
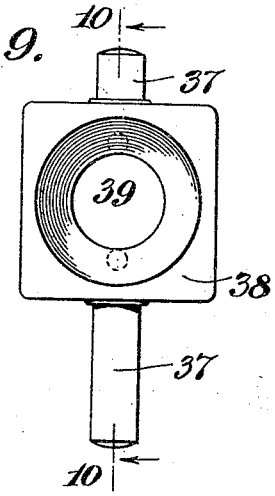
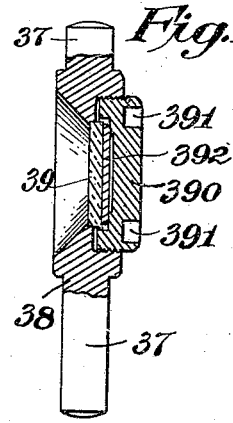

PHILIP FERBER, OF HOBOKEN, NEW JERSEY, ASSIGNOR TO THE KEUFFEL & ESSER COMPANY, OF HOBOKEN, NEW JERSEY, A CORPORATION OF NEW JERSEY.

SOLAR TRANSIT.

955,392.      Specification of Letters Patent.      Patented Apr. 19, 1910.

Application filed May 22, 1909. Serial No. 497,747.

*To all whom it may concern:*

Be it known that I, PHILIP FERBER, a citizen of the United States, and resident of Hoboken, Hudson county, New Jersey, have invented certain new and useful Improvements in Solar Transits, of which the following is a specification.

This invention relates to solar transits and its novelty consists in the construction and adaptation of the parts as will be more fully hereinafter pointed out.

In the drawings, Figure 1 is a side elevation of an instrument embodying my invention; Fig. 2 is a perspective of the striding level used with both the main telescope and the solar telescope in the device shown in Fig. 1; Fig. 3 is a rear elevation of the instrument with the main telescope removed; Fig. 4 is a top plan view of the instrument, the sleeve of the solar telescope being shown in horizontal section and the ends of the main telescope being removed in order to get the illustration within the limits of the sheet; Fig. 5 is a detail of the latitude arc frame; Fig. 6 is a longitudinal section through the sleeve of the solar telescope on the plane of the broken line 6—6 of Fig. 7 and Fig. 7 is an end view thereof; Fig. 8 is a top plan view and partial horizontal section of the solar telescope; Fig. 9 is an enlarged front view of the reflector holder and shaft of the solar telescope; Fig. 10 is a section through the holder, on the plane of the broken line 10—10 of Fig. 9.

In the drawings, 1 is the base of an instrument of usual form and provided with means whereby it may be mounted on a tripod or frame, leveled and circularly adjusted thereon and with a compass to determine its position. These devices are common to the art and form no part of the invention and they are omitted from the drawings for the sake of clearness.

Secured to and springing upwardly from the base 1 are standards 2, 2, which are provided near their upper extremities with bearing surfaces adapted to receive the axle 3 of the main telescope and which axle is expanded centrally into an annulus 5 of spherical exterior to serve as the support for the main telescope 6. This latter it will be understood is provided with the usual attachments which are omitted from the drawing in order not to complicate it and because they form no part of this invention.

Caps 7 secured in place in any suitable manner, as by screws 8, prevent any vertical displacement of the axis 3 of the main telescope 6 in its bearings.

Adapted to closely fit over the axle 3 and intermediate the standards 2 on one side and the annulus 5 is arranged a sleeve 10 (see Figs. 3, 4, 6 and 7) having a conical body adapted to fit closely over the axle 3 provided near its outer end with an annular flange 11 having threaded apertures 12 adapted to receive the threaded ends of screws 13 by means of which there is secured firmly against the annular flange 11 a latitude arc frame 14. The body is provided with a projecting end 100 beyond the flange 11.

The latitude arc frame (see Fig. 5) comprises a longitudinal member 15 apertured at 16 to embrace the end 100 of the sleeve 10 and provided with holes 17 to receive the screws 13. It also has two radial members 18 and 19 between which is arranged a latitude arc plate 20 suitably graduated as indicated at 21. It is also provided with two laterally extending collars 22 and 23, one at each end adapted to encircle and support a solar telescope 30. The collars are provided with means, as screws 24, 24, by which they are tightened and their ends drawn together after the solar telescope has been placed therein, and the solar telescope tube 31 is provided with annular flanges 32 and 33 whereby its longitudinal displacement with respect to the collars is prevented.

By the described construction the solar telescope is firmly and securely mounted on the same horizontal axis as the main telescope and the latitude arc frame is securely fixed in position with respect thereto. It will be noted that the latitude arc frame is placed inside of the standards and that the collars which support the solar telescope constitute an integral part of such frame. By this construction a counterweight is avoided.

The axis 3 is provided with an annular flange 300 and the sleeve 10 is provided with a similar flange 301. These flanges are identical in diameter and are adapted to receive the feet 302 of a striding level 303 provided to be mounted thereon, and which are so spaced apart that they rest upon these flanges. The solar telescope 30 is provided with annular flanges 304 and 305 identical in diameter with the flanges 300 and 301 on the main telescope and also spaced apart a proper distance to receive the feet 302 of the striding level 303.

The latitude arc plate 20 is provided with a groove 26 and is adapted to be engaged by a gripping plate 27 adjustably secured against which is a clamp 28 provided with a screw 29 adapted to bring these together. A fork 290 depends from the plate 27 and between its arms is mounted a spherical nut 291 internally threaded to receive an adjusting screw 293 having a knurled head 294 by which it may be rotated and which screw passes through suitable bearings 295 on one of the standards 2. By means of this device the latitude arc plate may be readily and accurately circularly adjusted. A vernier plate 25 is mounted between two of the standards to coöperate with the graduations on the latitude arc.

Secured at the end of the solar telescope tube 30, or made integral therewith, is a sub frame comprising two plates 35 and 36 suitably apertured to receive a shaft 37 on which a reflector holder 38 is mounted between the plates 35 and 36. The reflector 39 is fastened within the holder by a threaded cap 390 provided externally with spanner holes 391, so that it cannot be opened without the proper tool. A cork washer 392 prevents any distortion of the reflector when the cap is put into position. A declination arm 393 secured to the shaft 37 and moved by a threaded rod 394 having a knurled head 395 permits of an accurate adjustment of the shaft 37 and consequently of the reflector 39 with respect to the longitudinal axis of the solar telescope. A curved graduated plate 396 secured to the body of the telescope 30 has a bracket 397 through which the rod 394 is adapted to pass, and a vernier 398 secured to and moving with the arm 393 permits an accurate measurement to be made of the extent of movement of the reflector.

Secured to the end of the solar telescope near its eye piece is a sleeve 40, preferably made of aluminum, and provided with a knurled annulus 41 by which the telescope may be manually rotated and an annular surface 44 graduated as an hour circle. This surrounds and protects the cross hair adjusting screws indicated at 42. This sleeve is internally threaded at 43 so that it may be removed for the necessary adjustment of the screws.

What is claimed as new is:—

1. A solar transit comprising a base, standards secured thereto, a transverse telescope axle arranged between the same, and two telescopes carried by the axle between the standards, the axial line passing transversely through both telescopes.

2. In combination, a telescope axle, a sleeve mounted to be revolved thereon, and a frame secured to the sleeve for supporting a second telescope on the same axial line.

3. In an instrument of the kind described, a main telescope axle, a frame secured thereto and carrying two rings, and a telescope adapted to be secured in the rings so that its axis of revolution is identical with that of the main telescope axis.

4. In an instrument of the kind described, a latitude arc frame, comprising a longitudinal member, two radial members, and an arc-shaped member supported between the two radial members, the longitudinal member being provided with means whereby it may be detachably secured to a telescope axis, consisting of an aperture in the longitudinal member, a sleeve adapted to fit over the telescope axis, and means for securing the longitudinal member to the sleeve.

5. A main telescope axis, a sleeve encircling the same provided with an annular flange and a tubular portion extending beyond the flange, a frame fitting over the tubular portion, means for securing the frame against the annular flange, and means for supporting a solar telescope on the frame.

6. A main telescope axis, a sleeve encircling the same provided with an annular flange and a tubular portion extending beyond the flange, a frame fitting over the tubular portion, means for securing the frame against the annular flange, a solar telescope and means for supporting it on the frame, comprising laterally projecting collars encircling the tube of the solar telescope.

7. A main telescope axis, a sleeve encircling the same provided with an annular flange with a tubular portion extending beyond the flange, a frame fitting over the tubular portion, means for securing the frame against the annular flange, a solar telescope, and means for supporting it on the frame comprising laterally projecting collars encircling the tube of the solar telescope, in combination with means to prevent the displacement of the telescope in the collars, comprising annular flanges on the telescope tube against which the collars are adapted to abut.

8. A main telescope axis, a sleeve encircling the same provided with an annular flange and a tubular portion extending beyond the flange, a frame fitting over the tubular portion, means for securing the frame against the annular flange, a solar telescope, and means for supporting it on the frame, comprising laterally projecting collars encircling the tube of the solar telescope, in combination with means to prevent the displacement of the telescope in the collars, comprising annular flanges on the telescope tube against which the collars abut, and means for tightening the collars as they encircle the tube.

9. A main telescope axis, a sleeve encircling the same provided with an annular flange and a tubular portion extending beyond the flange, a frame fitting over the tubular portion, means for securing the frame against the annular flange, a solar telescope, and means for supporting it on the frame, comprising laterally projecting collars encircling the tube of the solar telescope, in combination with means to prevent the displacement of the telescope in the collars, comprising annular flanges on the telescope tube against which the collars abut, and means for tightening the collars as they encircle the tube, consisting of flanges on the collars and screws to draw their ends together.

10. A main telescope axis, a sleeve encircling same provided with an annular flange and a tubular portion extending beyond the flange, a frame carrying a latitude arc, suitably graduated, and provided with an aperture to fit over the tubular portion, means for securing the frame against the annular flange, and means for supporting a solar telescope on the frame.

11. A main telescope axis, a sleeve encircling same provided with an annular flange and a tubular portion extending beyond the flange, a frame carrying a latitude arc, suitably graduated, and provided with an aperture to fit over the tubular portion, means for securing the frame against the annular flange, and means for supporting a solar telescope on the frame, comprising laterally projecting collars encircling the tube of the solar telescope.

12. A main telescope axis, a sleeve encircling the same provided with an annular flange and a tubular portion extending beyond the flange, a frame carrying a latitude arc, suitably graduated, and provided with an aperture to fit over the tubular portion, means for securing the frame against the annular flange, a solar telescope, and means for supporting it on the frame, comprising laterally projecting collars encircling the tube of the solar telescope, in combination with means to prevent the displacement of the telescope in the collars, comprising annular flanges on the solar telescope tube against which the collars abut.

13. A main telescope axis, a sleeve encircling the same provided with an annular flange and a tubular portion extending beyond the flange, a frame carrying a latitude arc, suitably graduated, and provided with an aperture to fit over the tubular portion, means for securing the frame against the annular flange, a solar telescope, and means for supporting it on the frame, comprising laterally projecting collars encircling the tube of the solar telescope, in combination with means to prevent the displacement of the telescope in the collars, comprising annular flanges on the telescope tube against which the collars abut, and means for tightening the collars as they encircle the tube.

14. A main telescope axis, a sleeve encircling the same provided with an annular flange and a tubular portion extending beyond the flange, a frame carrying a latitude arc, suitably graduated, and provided with an aperture to fit over the tubular portion, means for securing the frame against the annular flange, a solar telescope, and means for supporting it on the frame, comprising laterally projecting collars encircling the tube of the solar telescope, in combination with means to prevent the displacement of the telescope in the collars, comprising annular flanges on the telescope tube against which the collars abut, and means for tightening the collars as they encircle the tube, consisting of flanges on the collars and screws to draw their ends together.

Witness my hand this 19th day of May 1909, at Hoboken, N. J.

PHILIP FERBER.

Witnesses:
BOWDEWINE B. VAN SICKLE,
MORRIS W. LEE.